(12) United States Patent
Peters et al.

(10) Patent No.: US 8,225,368 B2
(45) Date of Patent: Jul. 17, 2012

(54) IDENTIFYING BROADCAST CONTENT

(75) Inventors: Marc Andre Peters, Eindhoven (NL); Wilhelmus Henrica Gerarda Maria Van Den Boomen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1220 days.

(21) Appl. No.: 11/719,433

(22) PCT Filed: Nov. 11, 2005

(86) PCT No.: PCT/IB2005/053721
§ 371 (c)(1),
(2), (4) Date: May 16, 2007

(87) PCT Pub. No.: WO2006/054216
PCT Pub. Date: May 26, 2006

(65) Prior Publication Data
US 2009/0148122 A1 Jun. 11, 2009

(30) Foreign Application Priority Data
Nov. 17, 2004 (EP) .................................... 04105853

(51) Int. Cl.
*H04N 7/173* (2006.01)
*H04N 7/16* (2006.01)

(52) U.S. Cl. ......... 725/117; 725/114; 725/144; 725/147

(58) Field of Classification Search .................. 725/37, 725/44–46, 55, 58, 61; 386/35, 45, 46, 68, 386/70, 125, 126
See application file for complete search history.

(56) References Cited

U.S. PATENT DOCUMENTS

| 7,630,960 | B2 * | 12/2009 | Koike et al. ........................... 1/1 |
| 2002/0038352 | A1 * | 3/2002 | Ashley ........................... 709/217 |
| 2003/0041327 | A1 * | 2/2003 | Newton et al. ................... 725/44 |
| 2003/0118014 | A1 | 6/2003 | Iyer et al. |
| 2003/0195863 | A1 | 10/2003 | Marsh |

FOREIGN PATENT DOCUMENTS

| WO | WO03063492 A1 | 7/2003 |
| WO | WO 2004098173 A1 * | 11/2004 |

(Continued)

OTHER PUBLICATIONS

The TV-Anytime Forum: Specification Series: S-2 on: System Description (Informative With Mandatory Appendix B), Document No. SP002v1.2, Apr. 5 2002, XP002292779.

(Continued)

Primary Examiner — Hai V Tran

(57) ABSTRACT

In a broadcast system (210) each broadcast content item is identified by a broadcast Content Reference Identifier (CRID). In a storage device (220) with a storage (240) each broadcast content item is identified by a local CRID. A processor (230) stores a CRID list that includes for CRIDs an associated validity interval including a starting date and an ending date during which interval the CRID is unique for the content item. When the processor receives (400) a broadcast CRID, it determines (410) an initial validity interval for the broadcast CRID. The initial validity interval includes a starting date and an ending date during which interval the broadcast CRID is unique for the broadcast content item. It then determines (420) whether the initial validity interval overlaps with a validity interval stored in the CRID list for an identical CRID. If there is no overlap it adds (430) the broadcast CRID to the CRID list.

13 Claims, 5 Drawing Sheets

FOREIGN PATENT DOCUMENTS

WO    WO2004098173 A1    11/2004

OTHER PUBLICATIONS

Figure 1:
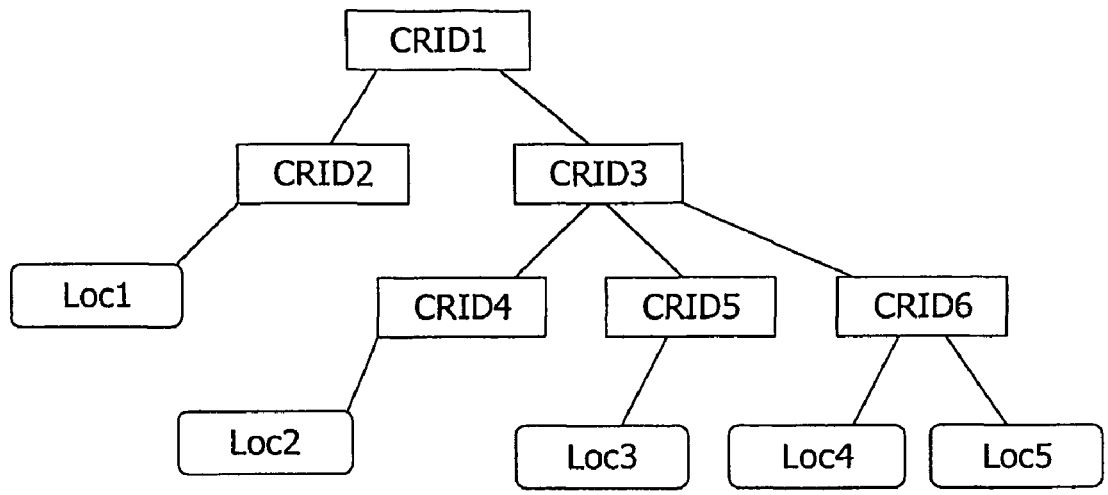

The TV-Anytime Forum: "Specification Series: S-3 on: Metadata (Normative) Part A: Metadata Schemas", Document No. SP003v13, Part A, Final Specification, Version 1.3, Dec. 15, 2002, XP002390104.

The TV-Anytime Forum: Specification Series: S-4 on Content Referencing (Normative), Document No. SP00v12, Final Specification, Version 1.2, Jun. 28, 2002, XP002390103.

"Digital Video Broadcasting (DVB); Carriage and Signalling of TV-Anytime Information in DVB Transport Streams"; ETSI Technical Specification 102 323 V1.1.1, ETSI Standards, European Telecommunications Standards Institute, Sep. 2004, XP014016292.

"Broadcast and On-Line Services: Search, Select, and Rightful Use of Content on Personal Storage Systems" (TV-Anytime); Part 4 Content Referencing, ETSI Technical Specification 102 822-4 V1.2.1 (Jan. 2006).

Davic ( Digital Audio-Visual Council) 1.5 Specifications, "TV Anytime and TV Anywhere"; XP002237927.

* cited by examiner

IDENTIFYING BROADCAST CONTENT

The invention relates to a method of identifying content items in a system including at least one storage device with a storage for storing content items broadcast through a broadcast system. The invention further relates to a system including at least one storage device with a storage for storing content items broadcast through a broadcast system and to a local storage device for use in such a system.

Digital broadcasting of content, such as audio or video, is increasingly used. With this the possibilities for identifying and locating broadcast content have increased too. The TV Anytime Forum has in the specification ETSI TS102 822-4 defined a mechanism for this. The TV-Anytime Forum specifications aim to enable applications to exploit local persistent storage in consumer electronics platforms. The rapid development of affordable high-capacity storage enables consumers to store large quantities of rich multimedia content for their personal use. This development in turn will provide new opportunities for content and service providers to offer large amounts of personalized multimedia for the benefit of consumers. An important device in the TV-Anytime concept is the so-called Personal Digital Recorder (PDR). The PDR may take any form, for example a set-top box (STB) with a hard disk, a VCR with a rewriteable optical storage, such as DVD+RW or Blu-ray, a hard disk recorder, or a personal computer (PC).

The key element in TV Anytime is to separate the actual content from the way it is referred to. Traditionally broadcast content was usually referred to in a way that also defined where/how the content was available. For example, a TV guide or EPG might refer to a news broadcast as "BBC1 10'o clock news of Oct. 21, 2004". Since BBC1 normally was fixedly assigned to a broadcasting channel this not only described the content but also defined the way to retrieve it. Using such an identifier for a double purpose, although sometimes efficient, had its limitations. For example, if a user saw an announcement on TV saying "There will be a new Agatha Christie Murder Mysteries series next year" without any details on the broadcasting itself, then an interested user could not instruct its PCR to record one or more of the broadcasts. The TV Anytime specification solves this by using a so-called CRID (Content Reference IDentifier) that identifies a content item (e.g. a specific news broadcast, a shows, etc.). The specification uses the term location for the information required for the retrieval of the content. This information depends on the storage and/or distribution technique used. For example, for a content item broadcast through a conventional analogue broadcasting system such information may include a broadcasting channel or frequency, a broadcasting date, a broadcasting starting time and ending time. For a digital broadcast though, for example the DVB system, the location may include parameters for a DVB stream, such as transport stream ID, service ID, table ID, and event ID. A CRID is thus coupled to one or more locators. The locator may not be known at the moment the CRID is created. A device needing the locator can query a so-called resolution handler that translates a CRID into the corresponding locator. The specification allows tree-structured CRIDs, where the leaves are formed by locators. In this way a CRID can be defined for a series of broadcasts, where each broadcast has its own CRID. A CRID is issued by an authority. The name of the authority is included in the CRID. For broadcasts, the authority is typically the broadcasting company responsible for the content, e.g. the BBC. The authority name is unique. This is achieved by using the DNS name registration system. The CRID further includes a free format string defined by the authority.

Ideally the CRID itself is unique in the sense that the same CRID is always coupled to exactly the same content item. A typical example of where this usually is the case is when a broadcast is re-run within a short period, say the next day. In such a situation, usually one CRID is used coupled to two locators, one for each broadcast. It would also be possible to use the same CRID twice, each time coupled to only one locator. Guaranteeing that the CRID is unique could put a high administrative burden on authorities. For example, it normally makes perfect sense to use a same or similar CRID for content that is re-broadcast on a larger time-scale. For example, a re-run on successive new-year eves. However, the content may not be exactly the same, e.g. a shortened version. It is thus not known whether a CRID uniquely defines the content over a long period of time. This poses problems for a PDR. For example, if a user requests recording of content specified by a certain CRID and the PDR has already once recorded content with such a CRID the PDR can not know whether or not it needs to re-record. The situation gets even worse if the PDR is connected though a network to a server or to other PDRs, e.g. in a peer-to-peer (P2P) network. Content with the same CRID may already be in one of those devices available for instant download, but is it the same?

It is an object of the invention to provide a method, system and PDR of the kind set forth that can better deal with non-unique CRIDs.

To meet an object of the invention, a method of identifying content items in a system including at least one storage device with a storage for storing content items broadcast through a broadcast system includes:

in the broadcast system, identifying each broadcast content item by a corresponding broadcast Content Reference Identifier (CRID);

in the device:

identifying each content item in the storage by a corresponding local Content Reference Identifier (CRID) identifying the content item;

storing in the storage a CRID list that includes at least for a selection of local CRIDs and broadcast CRIDs an associated validity interval including a starting date and an ending date during which interval the CRID is unique for the content item;

in response to receiving a broadcast CRID:

determining an initial validity interval for the broadcast CRID; the initial validity interval including a starting date and an ending date during which interval the. broadcast CRID is unique for-the associated broadcast content item;

determining whether the initial validity interval overlaps with a validity interval stored in the CRID list for an identical CRID or not; and adding the broadcast CRID to the CRID list only if no overlap is determined.

By using validity intervals in the local storage device, this device can much better determine whether or not a broadcast CRID can be assumed to be unique (in the sense that same CRIDs are associated with exactly the same content items. It can safely be assumed that broadcast authorities will ensure that a CRID is unique for a certain period of time, such as the period for which an EPG (Electronic Program Guide) is issued. If same CRIDs thus have overlapping intervals they may be assumed to relate to the same content. These CRIDS then need not be in the CRID list twice (or multiple times). If the intervals of same CRIDS do not overlap it can not be automatically assumed that they are related to the same content. Such CRIDS may need to be entered multiple times in the list. It will be appreciated that the list may only contain CRIDS that relate to broadcast content, i.e. content that has already been recorded from a broadcast or content to be broadcast (e.g. CRIDs from an EPG). If so desired the CRID list may also include references to non-broadcast content.

According one form of the invention, the method includes, in response to determining an overlap, updating the validity interval stored in the CRID list to having as the starting date of the validity interval an earliest date of the starting dates of the initial validity interval and the stored validity interval and as the ending date a latest date of the ending dates of the initial validity interval and the stored validity interval. In this way the validity interval can be stretched to reflect that it is safe to assume that the CRID is unique for a longer period. This is particular useful for frequent re-runs that can now be safely identified as being related to the same content. Such content then needs to be recorded only once if so desired.

According to one form of the invention, the step of determining an initial validity interval for a received broadcast CRID includes using a default validity interval. In a simple form, the interval may be just one or a few days. Preferably the interval is set to a conventional period of time covered by an EPG, such as a few weeks. The user may be provided with the possibility of setting the default interval.

According to one form of the invention, the step of determining an initial validity interval for a received broadcast CRID includes querying a broadcast resolution handler to translate the-received broadcast CRID to at least one broadcast locator, where each locator includes one broadcasting date for the associated broadcast content item, and determining the initial validity interval in dependence on the broadcasting dates of the broadcast locators associated with the CRID. This is a safe way of determining the interval since it can be assumed that the resolution handler provides information that is unique at the moment of the query.

According to one form of the invention, if the CRID is associated with a plurality of broadcast locators, the step of determining the initial validity interval includes using as the starting date an earliest one of the broadcasting dates of the broadcast locators and as the ending date a latest one of the broadcasting dates of the broadcast locators. In this way the validity interval can be safely stretched.

According to one form of the invention, the system includes a plurality of said storage devices; each of the plurality of storage devices including communication means for bi-directional communication with each other through a wide area peer-to-peer (P2P) network; the method including in said storage device in response to receiving a CRID of interest:
querying the P2P network for whether the received CRID is locally stored in the storage device,
receiving in each positive response a respective validity interval and content locator identifying a storage location of the associated content item in the responding storage device,
determining for each positive response whether the validity interval received in the response overlaps with a validity interval stored in the CRID list for an identical CRID or not; and
adding the received CRID to the CRID list only if no overlap is determined.

In this way the mechanism is also extended to cover P2P devices.

According to one form of the invention, the system includes a server for on-demand retrieval of content items stored in the server through a communication system; the method including in the storage device in response to receiving a CRID of interest:
querying the server for whether the received CRID is stored in the server,
receiving in a positive response a respective validity interval and content locator identifying a storage location of the associated content item in the server,
determining for a positive response whether the received validity interval overlaps with a validity interval stored in the CRID list for an identical CRID or not; and
adding the received CRID to the CRID list only if no overlap is determined In this way the mechanism is also extended to cover server-based storage networks.

According to one form of the invention, the storage device is a Personal Digital Recorder (PDR).

According to one form of the invention, the method includes storing in the CRID list for each stored CRID metadata associated with the content item associated with the CRID; the querying also including receiving in a response metadata associated with the queried CRID and performing the step of adding the received CRID to the CRID list only if the received metadata is distinct from metadata stored in the CRID list for the received CRID. In this way more CRIDs can be identified as actually being related to the same content.

According to one form of the invention, the method includes the step of presenting identical CRIDs in the CRID list as identifying separate content items. The validity interval thus aids in presenting only relevant information to the user, while avoiding that CRIDs are linked that actually may refer to different content.

According to one form of the invention, the storage device is operative to record broadcast content in the storage; the method including using the CRID list to determine at least one of the following for a content item to be recorded:
whether or not the content item has already been recorded;
which broadcast locator to use.

Using the validity intervals it can be safely assumed that a CRID in the list is unique. All locators associated with that CRID cover thus the same content. The storage device can thus freely choose between those local or broadcast locators. If already a local locator is present, no re-recording may be required. If several future broadcast locators are present an optimal choice may be made, e.g. to avoid conflicts with other recordings.

According to one form of the invention, the storage device is operative to record broadcast content in the storage; the method including using the CRID list to determine at least one of the following for a content item to be recorded:
whether or not the content item has already been recorded;
to choose between using a broadcast locator, a locator for the server or a locator for the P2P storage device for retrieval.

This gives even more choice.

These and other aspects of the invention are apparent from and will be elucidated with reference to the embodiments described hereinafter.

IN THE DRAWINGS

Figure 2:
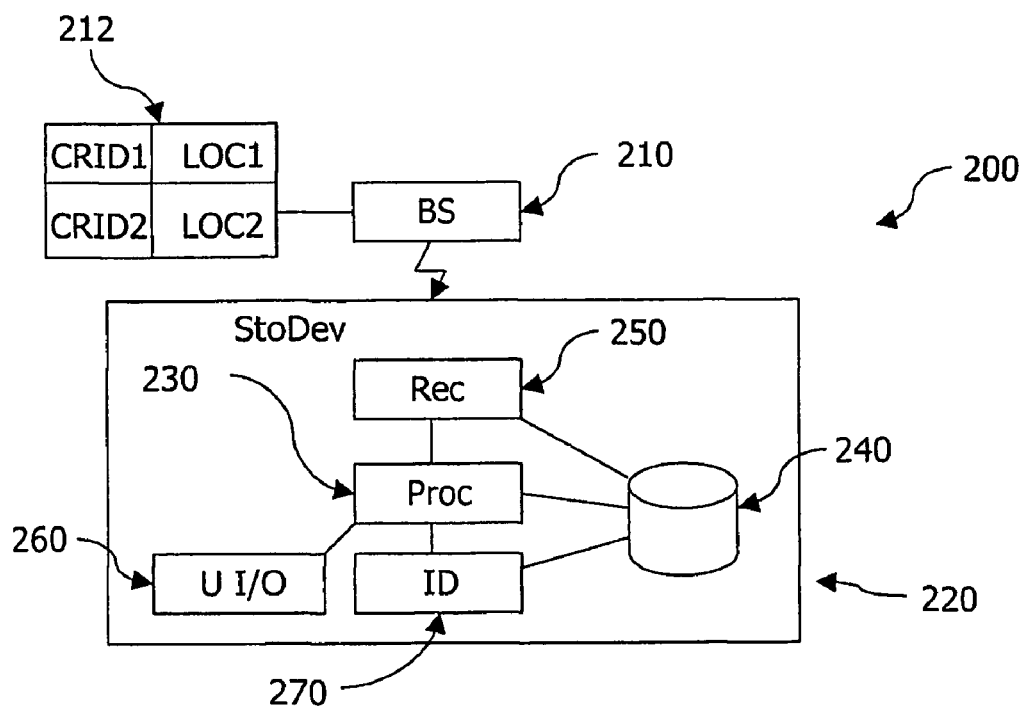
Figures 3, 4:
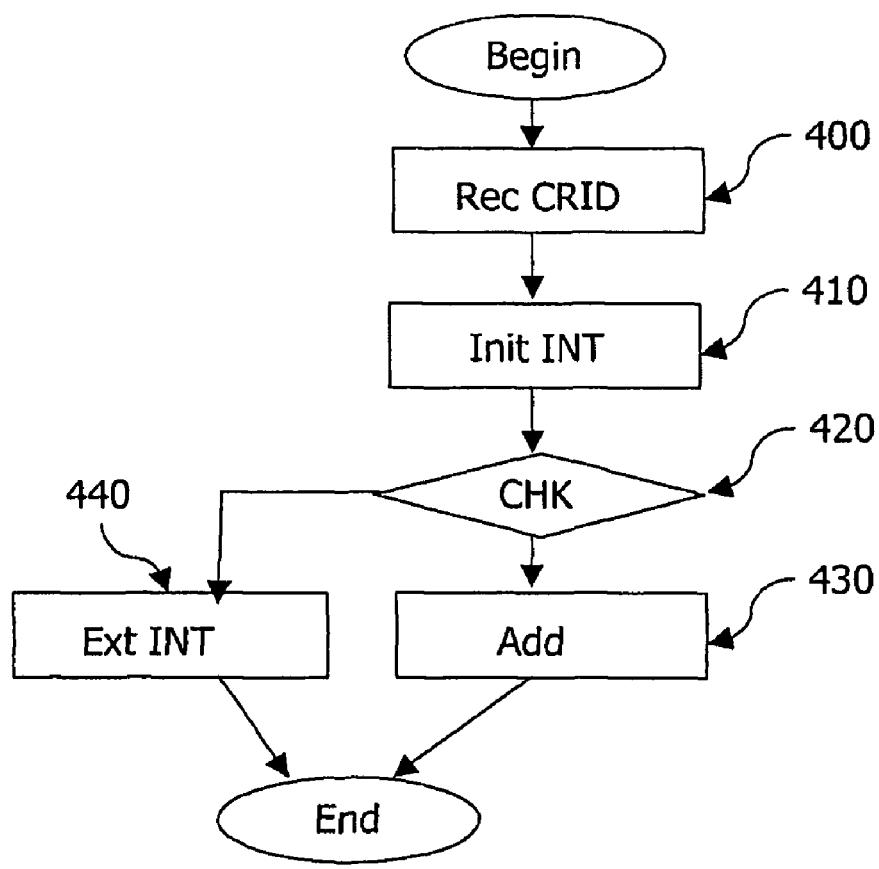
Figure 5:
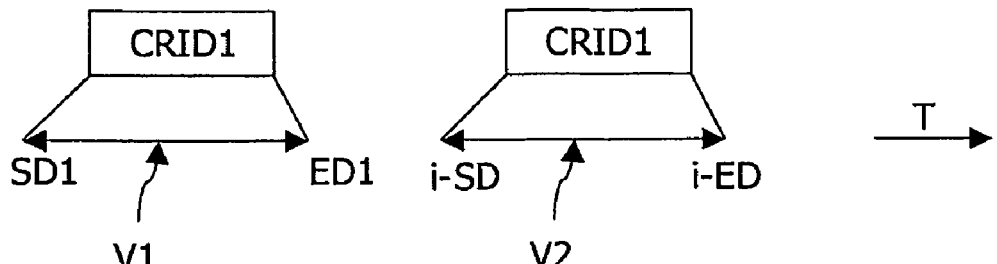
Figure 7:
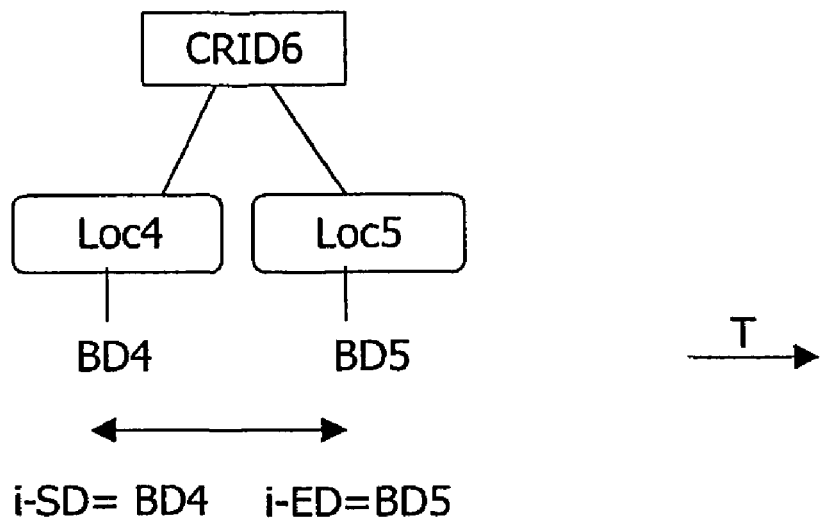
Figure 8:
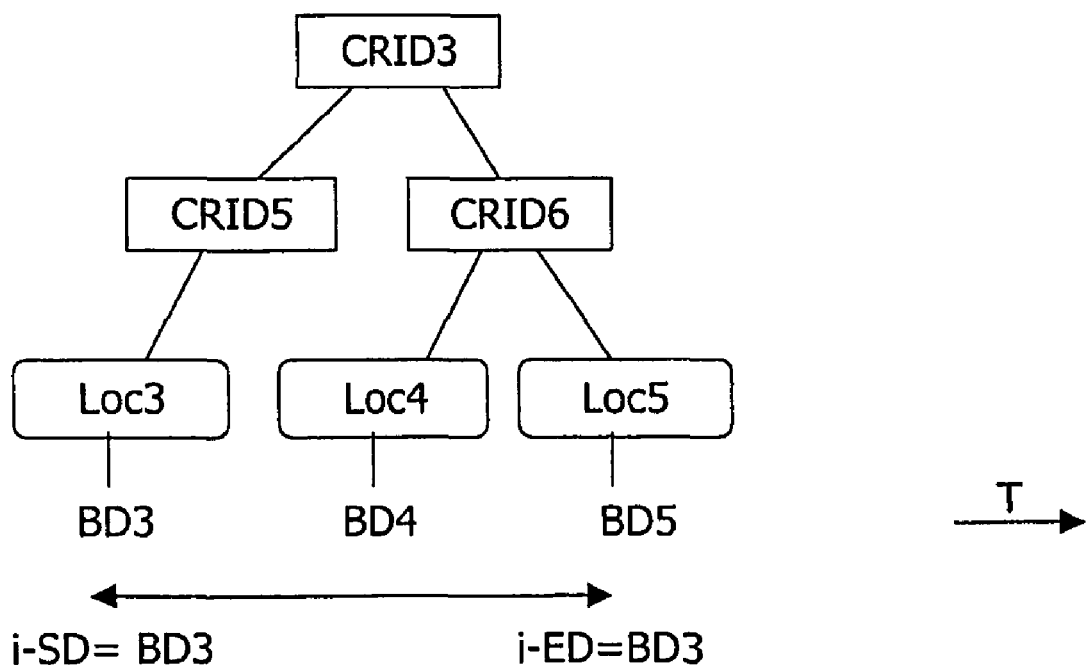
Figure 9:
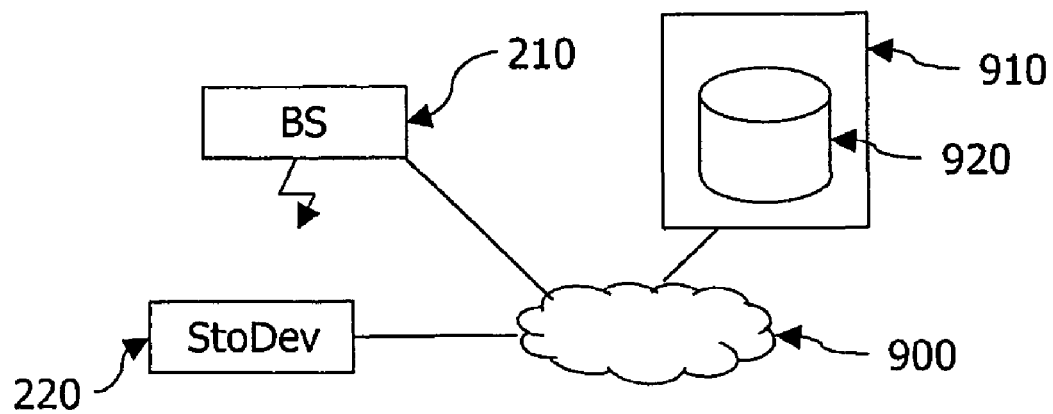
Figure 10:
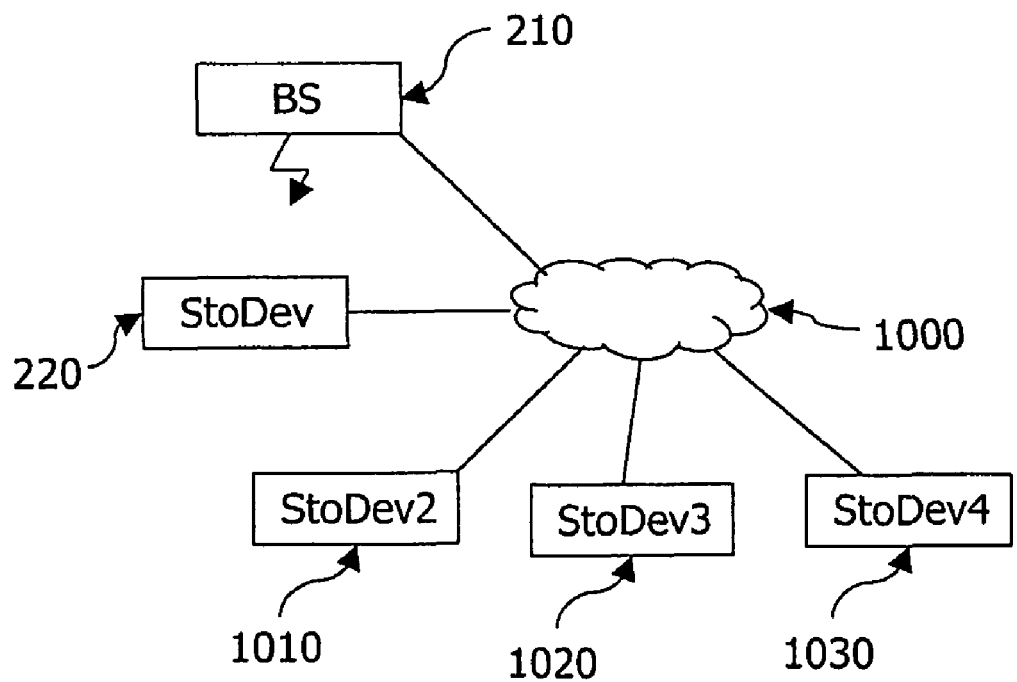

FIG. 1 shows a CRID tree;
FIG. 2 shows a block diagram of a system according to the invention,
FIG. 3 shows a CRID list according to the invention;
FIG. 4 illustrates the method according to the invention;
FIGS. 5 and 6 shows dealing with (non-)overlapping intervals;
FIGS. 7 and 8 illustrates determining an initial interval;
FIG. 9 shows a further embodiment with a server; and FIG. 10 shows a further embodiment with a P2P network.

The method and system according to the invention use an identifier, referred to as CRID, for referring to content items. As an example, details will be provided for the CRID mechanism as defined in ETSI TS102 822-4, hereby incorporated by reference. It will be understood that the invention can also be applied in other systems with a CRID-like referencing technique where the actual content as is retrieval through a locator (i.e. identifying for the purpose of retrieval) is separated from referring to the content (i.e. identifying the content for referring to it).

In general, a content referencing process begins after a content item has been selected by a consumer through to, but not including, the actual acquisition of the desired content item. Typically the following three aspects can be distinguished:
1. The content selection process resulting in a Content Reference IDentifier (CRID).
2. The location resolving service resulting in one or more pointers to instances of that content (locators) or one or more content reference identifiers.
3. The retrieval process using one of these locators to subsequently acquire the content.

Before the process of content referencing can be employed, a selection process must supply a CRID. This CRID identifies a specific content item, but does not specify where that content item can be found. A storage device according to the invention may receive a CRID of interest in many ways, for example through an Electronic Programme Guide (EPG) in a digital broadcast system, via Internet from a server or another storage device (e.g. in a P2P network), or by the user entering it via a user interface of the storage device, or by a user receiving it through a network (e.g. via Internet email) from another user.

Given a CRID, there can still be numerous instances of the same desired content item (for example a broadcast may be repeated, a web site may be mirrored, the content item may be available from different content providers, via different networks, etc). The method and system according to the invention provide an approach on reliably narrowing this down as will be described in more detail below.

A content item that a CRID refers to might be a grouping of other content items, for example a CRID for referring to an entire series of programs. The key concept of content referencing is the separation of the reference to a content item— the CRID—and information that is related to its retrieval. The separation provided by the CRID in principle enables a one-to-many mapping between content references and the locations of the deliverables.

In this description, content is a general term. It is the context of a service that determines what content will be delivered upon following a locator. In that sense a content instance is any deliverable that can be acquired (via a respective locator) by a consumer. Thus, content may relate to many types of information, such as a television program, a radio program, an audio track, an MPEG-4 object, a scene, an image, music, etc. Most examples given here will refer to broadcast TV programs, but it will be understood that that is just as an example. It will also be understood that the location resolution service provider is the party who declares what can be considered content items (e.g. separate programs, serials, etc). A content item is merely part of the content that is separately identified by the involved party.

Location resolution is the process of translating a CRID into other CRIDs or locators. Location resolution involves mapping a location-independent content reference (the CRID) to its location in time (e.g. scheduled transmission time in a broadcast system) and/or space (e.g. TV channel, IP address). In this description, locations in time/space are referred to as "locators".

In general there will be a party, referred to as CRID authority, who creates a CRID. This authority normally also provides the ability for the CRID to be resolved into locators or other CRIDs. The authority may perform this role directly or through another party, for example by providing the required information to that party via Internet. In principle a CRID may take any form. It could be just a number, e.g. a 32-bit or 64-bit identifying number. Preferably, the CRID itself contains a representation of text, so that this textual part can be presented to a user as well (e.g. if the user receives CRID via email the CRID itself also has some human-interpretable content). It will be appreciated that the text in itself is not required to be in the CRID. Equally well textual information can be retrieved (e.g. from the resolving authority in the form of metadata associated with the CRID). A preferred form of a CRID is the form used in TV Anytime. TV Anytime uses the following syntax for defining a CRID:

CRID://<authority>/<data>

In this definition, the authority is given as: <DNS name><name_extension>. This preferred form uses a CRID that includes a (textual) identification of the authority that issued the CRID. To distinguish between authorities, each authority has a unique name. In the preferred embodiment based on the TV Anytime definition, the authority name <DNS name> uses the Domain Naming System (DNS) to provide unique names for each authority. This also enables the authority to issue unique CRID names by using a unique data field. In this definition, <data> is a free format string that is Uniform Resource Identifier (URI) compliant, and is meaningful to the authority given by the <authority> field. An example of a syntactically valid CRID is:

CRID://bbc.co.uk/teletubbies.

This CRID is created by the authority BBC, identified by the name bbc.co.uk, and with a data part of "teletubbies".

It will be understood that at a moment in time, a CRID is an unambiguous identifier that refers to a piece of content, however multiple CRIDs may refer to that same piece of content. FIG. 1 shows an example of a tree structured CRID. The exemplary tree structure will be explained for a specific example. In this example, the root CRID (CRID1) identifies a new television series. The series starts with a commentary identified by CRID2 and the actual series identified by CRID3. The commentary is broadcast once, identified by locator Loc1. The series has three separate episodes, identified by CRID4, CRID5 and CRID6 respectively. The first two episodes were only broadcast once (indicated by locators Loc2 and Loc3, respectively). The third episode was broadcast twice, identified by Loc4 and Loc5. In this example, hierarchically arranged CRIDs are used to group content items, such as a series. A CRID may also resolve into one or more CRIDs to allow one authority to refer to CRIDs of another authority.

A locator specifies a location, and possibly time of availability, where a content item can be acquired. Since there are many ways in which a storage device can acquire content (e.g. from a terrestrial broadcast or downloading on demand through Internet) a locator may be specified in many ways. This itself is not part of the invention; any suitable form may be used. For example, a DVB locator will contain location parameters for a DVB stream, such as transport stream ID, service ID, table ID and event ID.

FIG. 2 shows a basic form of a system 200 for identifying content items according to the invention. The system includes broadcast system 210 and at least one storage device 220. Any suitable form of broadcasting system may be used, preferably a fully digital form but the techniques described below can equally well be employed in broadcasting systems that use analogue techniques for the content itself. Any transmission technique may be used, e.g. terrestrial broadcasting, broadcasting through a cable, broadcasting via satellites, etc. In particular also broadcasting through the Internet is included as a possible medium. With broadcasting is meant that all devices with a suitable receiver can in principle receive the same transmission at the same time (typically through one shared broadcasting channel). It will be appreciated that actual receipt may be conditional, e.g. upon paying for it. Any technique may be used for verifying this (e.g. conditional access techniques). It will also be understood that receipt may be limited to a subset of the possible receivers, e.g. using multicasting techniques, for example where a group of receivers is identified using a group address. In the context of this invention such multicasting is also covered under the term broadcasting. Thus, the broadcasting system may use any suitable network for content delivery to a consumer electronics storage device, including various delivery mechanisms (e.g. ATSC, DVB, DBS and others) and the Internet and enhanced TV.

The broadcast system 210 including means 212 for identifying each broadcast content item by a corresponding broadcast Content Reference Identifier (CRID). This may be done in any suitable way. For example, the broadcasting system may include a server-like computer system with a storage, e.g. arranged as database, that includes representations of the CRID tree as shown in FIG. 1. FIG. 2 shows a tabular representation for a very simple (flat) CRID tree. It will be appreciated that the representation of the CRID tree may vary in time. For example, initially the idea of the entire series may materialize without knowing any actual broadcasting times. In such a situation the representation would only represent CRID1 to CRID6. By the time the first broadcast is actually fixedly scheduled, also Loc1 may be included. After this broadcast Loc1 and thus also CRID2 and CRID1 may be removed and other locators may be added for known broadcasting times. If the series is a major success and quick re-runs are scheduled also more CRIDs may be added over time. The broadcasting system 210 makes the CRID tree information (or part of it) available, e.g. through broadcasting in EPGs, through on-demand retrieval though the internet, etc.

The storage device 220 includes a storage 240 for storing content items broadcast through the broadcast system 210. The storage 240 may take any suitable form. Preferably non-volatile storage is used, such as solid state memory (e.g. flash), recordable or rewriteable optical storage (e.g. DVD+RW or Blu-ray), or hard disk. For receiving the content the storage device includes receiving means 250. The type of receiving means may depend on the broadcasting network (e.g. a DVB receiver, Internet, etc.). If so desired, receipt may also be indirect, for example using a separate satellite receiver or set top box and receiving it through a wired or wireless local network, like IEEE 1394, Ethernet, or WiFi. The storage device may be any suitable consumer electronics device, such as PC, set top box, or Personal Digital Recorder (PDR).

The storage device 220 further includes means 270 for identifying each content item in the storage 240 by a corresponding local Content Reference Identifier (CRID) identifying the content item. Any suitable way of storing this may be used. A preferred embodiment will be described with reference to FIG. 3. For recorded broadcast content the local CRID is the same as the broadcast CRID that identified the content.

The storage device 220 further includes a processor 230. Any suitable processor may be used, such as an embedded processor, like ARM-based processors, a general purpose processor, like those used in personal computers, or a digital signal processor. The processor 230 is operated under control of a program. The program may be stored in any suitable memory, e.g. embedded or separate non-volatile solid state memory (e.g. ROM), a hard disk, etc. The processor ensures that in a storage (e.g. storage 240) a CRID list is stored with information for CRIDs of interest. The CRIDs of interest include at least some of the CRIDs of the broadcast system, e.g. those in the current EPG. Preferably it also includes a selection of local CRIDs (i.e. with local content being indicated by the associated locator). In particular this includes broadcast CRIDs whose associated content has been locally recorded. That content is still identified by the original CRID but is now associated with a different locator, being a locator that specifies how the content can be locally retrieved (e.g. a file identifier according to the file system of the storage 240). For CRIDs on the CRID list an associated validity interval is stored. FIG. 3 gives an example of how this can be done. In this example a tabular form is used. Persons skilled in the art can easily choose other representations. Each row of the table gives information for one CRID. The first field identifies the CRID, e.g. stores the CRID, or is a pointer/reference to another location holding the CRID (e.g. a locally stored CRID tree). The next two fields hold the validity interval. The first of those two fields holds the starting date; the second field holds the ending date. The CRID list may also include a pointer to the actually associated content (i.e. represent the local locator) or to a CRID tree with that locator. The validity interval gives the period during which the CRID is unique for the associated content item. In this example, the period is indicated using dates (i.e. on a day basis). This will be sufficient for normal applications. Persons skilled in the art may use more accurate (or less accurate) indications as well.

The processor 230 is programmed to determine an initial validity interval for a broadcast CRID when it receives it and wants to have it represented in the CRID list. This may include all CRIDs that are broadcast. Alternatively it only includes a selection of the broadcast CRIDs. For example, a user may have given its preferences (news, sport, etc.) to the local storage device 220 via a user interface 260, such as a remote control, keyboard, etc. The processor may access the resolver to obtain metadata associated with the CRID to perform the desired selection. The initial validity interval also includes a starting date and an ending date during which interval the broadcast CRID is assumed to be unique for the associated broadcast content item. FIG. 4 shows the steps of receiving 400 the broadcast CRID and determining 410 the initial validity interval. The processor 230 then checks in step 420 whether based on other knowledge it can assume the broadcast CRID to be unique within the scope of the entire system (e.g. for a longer period than indicated by the initial interval). In the basic embodiment the other knowledge is the local knowledge present in the CRID list. The processor does this check by determining whether the initial validity interval overlaps with a validity interval stored in the CRID list for an identical CRID or not. Clearly, if no knowledge is present on the same CRID then no overlap occurs. In step 430 the processor 230 ensures that the broadcast CRID is added to the CRID list in response to determining that there is no overlap. It will be appreciated that this does not rule out that there is already an identical CRID on the list. For example, this CRID may be based on a broadcast of a year earlier with possibly identical or similar. content. However, it can not safely be assumed that the content is the same, and it is thus preferred to have the CRID twice in the list and assume that the content may be different.

FIG. 4 also shows a preferred step 440 wherein the stored validity interval is extended in response to determining an overlap. This is done by updating the validity interval stored in the CRID list to having as the starting date of the validity interval an earliest date of the starting dates of the initial validity interval and the stored validity interval and as the ending date a latest date of the ending dates of the initial validity interval and the stored validity interval.

Figure 6A:
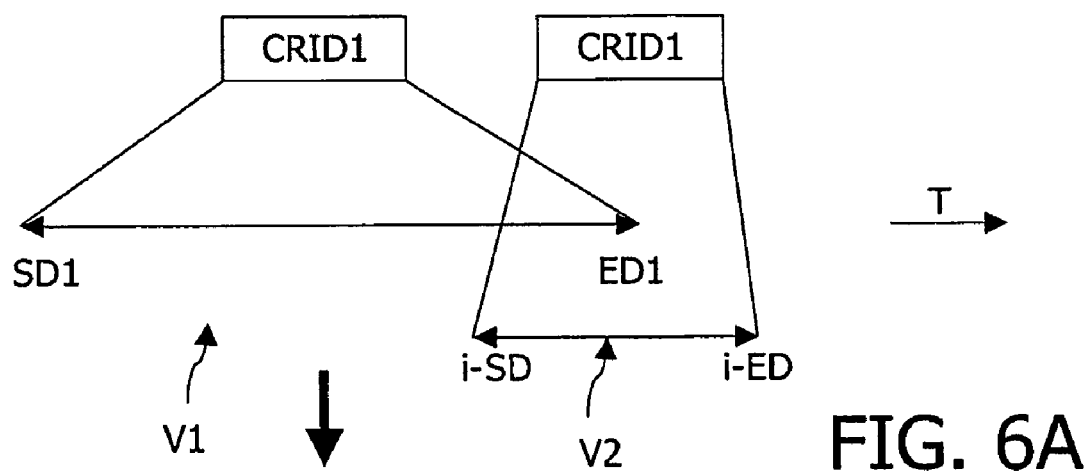
Figure 6B:
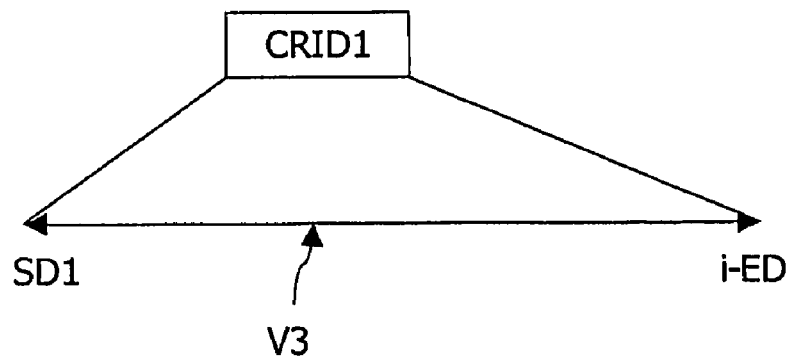

The two options are also illustrated further in FIGS. 5 and 6. In FIG. 5, CRID1 stored already on the CRID list has a validity interval V1 with starting date SD1 and ending date ED1. Now a broadcast CRID is received that is identical (i.e. also CRID1). For this an initial validity interval is determined, being V2, with starting date i-SD and ending date i-ED. As shown V2 does not overlap with the stored V1 and as a consequence the newly received broadcast CRID is added to the list with interval V2. On the other hand, FIG. 6A shows the situation where V2 does overlap V1. As a consequence, the newly received broadcast CRID is not added to the list. Instead a new interval V3 is determined (being the combination of V1 and V2) and stored for CRID1 in the CRID list as shown in FIG. 6B.

In an embodiment, the step 410 of determining an initial validity interval for a received broadcast CRID includes using a default validity interval. In a simple form, the interval may be just one or a few days. Preferably the interval is set to a conventional period of time covered by an EPG, such as a few weeks. This may be determined automatically by analyzing the EPG. The user may be provided with the possibility of setting the default interval, for example after having checked how long an EPG is usually valid and possibly specifying this separately for each EPG provider.

In a preferred embodiment, the step of determining an initial validity interval for a received broadcast CRID includes querying a broadcast resolution handler to translate the received broadcast CRID to at least one broadcast locator. Each locator includes one broadcasting date for the associated broadcast content item. The processor 230 then determines the initial validity interval in dependence on the broadcasting dates of the broadcast locators associated with the CRID. This is further illustrated in FIG. 7. In this example, the resolution handler provides data on part of the full original CRID tree shown in FIG. 1 still covering two broadcasts specified by Loc4 and Loc5. It can safely be assumed that during the period covered by these broadcasts, the CRID authority has ensured that the CRID is unique. Thus, in an embodiment the processor 230 determines the initial validity interval as being the interval with as the starting date an earliest one of the broadcasting dates of the broadcast locators and as the ending date a latest one of the broadcasting dates of the broadcast locators. Assuming that the received broadcast CRID is CRID 6 and that Loc4, and Loc5 have respective broadcasting dates of BD4, and BD5 that follow one in time, then the initial interval runs from BD4 to BD5, as shown in FIG. 7. It will be appreciated that all knowledge still present in the resolution handler on the CRID tree may be used. For example, if the received broadcast CRID is CRID6 then the query may simply give information on all locators hierarchically below CRID6. However in a further embodiment the tree is also queried at a higher level. In this example, it is assumed that also CRID 3 and the branch with CRID5 and Loc5 are still present. Although Loc5 should be assumed to refer to a different content (a different CRID is used), it may nevertheless be taken as a sign for which period the CRID tree is valid. Thus in this further embodiment the initial interval is determined to be BD3 to BD5. This is shown in FIG. 8.

In a further embodiment, taking as a default interval for each locator a period longer than just the broadcasting date (e.g. one week before until one week after the broadcasting date), could in this example give a larger maximum initial interval i-SD to i-ED, for example of six weeks if the broadcasting dates specified by Loc3, Loc4 and Loc5 are exactly each time two weeks apart.

FIG. 9 shows a block diagram of a further embodiment of the system according to the invention. Same reference numbers as used in FIG. 2 relate to the same parts and will not be described in detail here again. The system also includes a server 910 for on-demand retrieval of content items stored in a storage 920 of the server. The server 910 may be based on a conventional computer platform suitable to acts as a server. The server 910 may have the content stored in a hard disk based storage system, such as a RAID system. The content may have been received from the broadcasting system 210, e.g. via the broadcast or through a network like Internet. The content can be retrieved by the storage device 220 through a communication system 900, such as the Internet. The storage device 220 thus includes suitable hardware and/or software to communicate with the server 910. The storage device 220 uses the server 910 to increase the reliability of the interval on the CRID list and/or extend the interval. To this end, the processor 230 is programmed to, in response to receiving a CRID of interest, query the server 910 for whether the received CRID is stored in the server. If the storage device 220 receives a positive response that response includes a respective validity interval and content locator identifying a storage location of the associated content item in the server. The processor 230 then determines for a positive response whether the received validity interval overlaps with a validity interval stored in the CRID list for an identical CRID or not. This is in principle the same as has been described above for the broadcast CRIDs. The processor 230 then adds the received CRID to the CRID list only if no overlap is determined. This thus acts as a further filter.

FIG. 10 shows a block diagram of a further embodiment of the system according to the invention. In this embodiment the system includes a plurality of storage devices 220, 1010, 1020, and 1030. Each of those devices have in principle the functionality as has been described already for storage device 220. Additionally, each of the plurality of storage devices includes communication means (not shown) for bidirectional communication with each other through a wide area peer-to-peer (P2P) network 1000. The term P2P refers to a type of transient Internet network that allows a group of users of devices with the same networking program to connect with each other and directly access files from one another's data storage. Various P2P configurations exist, such as a centralized configuration, a decentralized configuration and a controlled centralized configuration. In a centralized configuration, the system depends on a central server that directs the communication between peers. "Napster" is an example of a centralized configuration. A decentralized configuration has not got a central server, and each peer is capable of acting as a client, as a server or as both. A user connects to the decentralized network by connecting to another user who is connected. "Gnutella" and "Kazaa" are examples of decentralized networks. In a controlled decentralized configuration a user may act as a client, as a server or as both as in the decentralized configuration, but specific operators control which user is allowed to access which particular server. "Morpheus" is an example of the latter. For this invention, in principle any type of P2P network may be used.

The processor 230 is programmed to, in response to receiving a CRID of interest, query the P2P network for whether the received CRID is locally stored in one or more of the storage devices. Each positive response from a storage device includes a respective validity interval and content locator identifying a storage location of the associated content item in the responding storage device. The responding storage device can retrieve this information from its CRID list. The processor 230 then determines for each positive response whether the validity interval received in the response overlaps with a validity interval stored in the local CRID list for an identical CRID or not. If no overlap is determined, the processor ensures that the received CRID is added to the CRID list. As described above, this acts as a further filter. It will be understood that the embodiments of FIGS. 9 and 10 can easily be combined. It will also be appreciated that techniques described above for extending intervals can also be applied to the two additional embodiments.

It will be appreciated that the invention also extends to computer programs, particularly computer programs on or in a carrier, adapted for putting the invention into practice.. The program may be in the form of source code, object code, a code intermediate source and object code such as partially compiled form, or in any other form suitable for use in the implementation of the method according to the invention. The carrier be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal that may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of identifying content items in a system including at least one storage device with a storage for storing content items broadcasted through a broadcast system which identifies each broadcast content item by a corresponding broadcast Content Reference Identifier (CRID); the method including:

identifying each content item in the storage of the storage device by a corresponding local Content Reference Identifier (CRID);

storing in the storage a CRID list that includes a selection of local CRIDs and broadcast CRIDs, an associated validity interval for each of said local and broadcast CRIDs having a starting date and an ending date, each of said local and broadcast CRIDs identifying a respective content item that remains unchanged during said associated validity interval;

receiving a new broadcast CRID;

determining an initial validity interval for the new broadcast CRID, the initial validity interval having a starting date and an ending date, during said initial validity interval the content item associated with said new broadcast CRID remains unchanged;

determining whether said new broadcast CRID is identical to a GRID stored in the CRID list;

determining whether or not the initial validity interval of said new broadcast CRID overlaps with the associated validity interval stored in the CRID list for the GRID identical to the new broadcast GRID; and adding the new broadcast GRID to the GRID list only if no overlap is determined, and if an overlap is determined, not adding the new broadcast CRID to the GRID list and updating the associated validity interval of the identical CRID stored in the GRID list to having, as the starting date of the updated associated validity interval, an earliest date of the starting dates of the initial validity interval of the new broadcast GRID and the stored associated validity interval of the identical stored CRID, and as the ending date, a latest date of the ending dates of the initial validity interval of the new broadcast GRID and the stored associated validity interval of the identical stored GRID.

2. The method as claimed in claim 1, where the step of determining an initial validity interval for the received new broadcast CRID includes using a default validity interval.

3. The method as claimed in claim 1, where the step of determining an initial validity interval for the received new broadcast GRID includes querying a broadcast resolution handler to translate the received new broadcast GRID to at least one broadcast locator, where each locator includes one broadcasting date for the associated broadcast content item, and determining the initial validity interval in dependence on the broadcasting dates of the broadcast locators associated with the new broadcast CRID.

4. The method as claimed in claim 3, where, if the new broadcast CRID is associated with a plurality of broadcast locators, the step of determining the initial validity interval includes using, as the starting date, an earliest one of the broadcasting dates of the broadcast locators, and as the ending date, a latest one of the broadcasting dates of the broadcast locators.

5. The method as claimed in claim 1, where the system includes a plurality of said storage devices; each of the plurality of storage devices including communication means for bi-directional communication with each other through a wide area peer-to-peer (P2P) network; the method including, in a storage device, in response to receiving a new CRID of interest:

querying the P2P network for whether the received new CRID is locally stored in any of the plurality of storage devices, receiving, in each positive response, a respective validity interval and content locator identifying a storage location of the associated content item in the responding storage device, determining, for each positive response, whether the validity interval received in the response overlaps with a validity interval stored in the GRID list for a CRID identical to the new CRID or not; and adding the received new CRID to the CRID list only if no overlap is determined.

6. The method as claimed in claim 1, where the system includes a server for on-demand retrieval of content items stored in the server through a communication system; the method including, in the storage device, in response to receiving a new CRID of interest:

querying the server for whether the received CRID is stored in the server, receiving, in a positive response, a respective validity interval and content locator identifying a storage location of the associated content item in the server, determining, for a positive response, whether the received validity interval overlaps with a validity interval stored in the CRID list for a CRID identical to the new CRID or not; and adding the received new CRID to the CRID list only if no overlap is determined.

7. The method as claimed in claim 1, where the storage device comprises a Personal Digital Recorder (PDR).

8. The method as claimed in claim 3, wherein said method further includes:

storing in the CRID list for each stored CRID metadata associated with the content item associated with the CRID;

wherein the querying also includes receiving in a response metadata associated with the queried CRID and performing the step of adding the received new CRID to the CRID list only if the received metadata is distinct from metadata stored in the CRID list for the received CRID.

9. The method as claimed in claim 1, wherein said method further includes the step of presenting identical CRIDs in the CRID list as identifying separate content items.

10. The method as claimed in claim 1, where the storage device is operative to record broadcast content in the storage; the method including using the CRID list to determine at least one of the following for a content item to be recorded:

whether or not the content item has already been recorded; which broadcast locator to use.

11. The method as claimed in claim 5, where the storage device is operative to record broadcast content in the storage; the method including using the CRID list to determine at least one of the following for a content item to be recorded:

whether or not the content item has already been recorded; and whether to use a broadcast locator, a locator for the server or a locator for the P2P storage device for retrieval.

12. A system for identifying content items, the system including a broadcast system and at least one storage device;

the broadcast system including means for identifying each broadcast content item by a corresponding broadcast Content Reference Identifier (CRID);

the storage device including:

a storage for storing content items for broadcast through the broadcast system;

means for identifying each content item in the storage by a corresponding local Content Reference Identifier (CRID);

a processor for, under control of a program, storing in the storage a CRID list that includes a selection of local CRIDs and broadcast CRIDs, an associated validity interval for each of the local and broadcast CRIDs having a starting date and an ending date, each of said local and broadcast CRIDs identifying a respective content item that remains unchanged during said associated validity interval; and in response to receiving a new broadcast CRID:

determining an initial validity interval for the new broadcast CRID, the initial validity interval having a starting date and an ending date, during said initial validity interval the content item associated with said new broadcast CRID remains unchanged;

determining whether said new broadcast CRID is identical to a CRID stored in said CRID list;

determining whether or not the initial validity interval of the new broadcast CRID overlaps with the associated validity interval stored in the GRID list for the identical CRID; and adding the new broadcast CRID to the CRID list only if no overlap is determined, and if an overlap is determined, not adding the new broadcast CRID to the CRID list and updating the associated validity interval of the identical CRID stored in the CRID list to having, as the starting date of the updated associated validity interval, an earliest date of the starting dates of the initial validity interval of the new broadcast CRID and the stored associated validity interval of the identical stored CRID, and as the ending date, a latest date of the ending dates of the initial validity interval of the new broadcast CRID and the stored associated validity interval of the identical stored CRID.

13. A non-transitory computer-readable storage medium on which is recorded a program for causing a processor to perform a method of identifying content items in a system including at least one storage device with a storage for storing content items broadcasted through a broadcast system that identifies broadcasted content items by respective broadcast Content Reference Identifiers (CRIDs), said method including:

identifying each content item in the storage by a corresponding local Content Reference Identifier (CRID);

storing in the storage a CRID list that includes a selection of local CRIDs and broadcast CRIDs, an associated validity interval for each of said local and broadcast CRIDS having a starting date and an ending date, each of said local and broadcast CRIDs identifying a respective content item that remains unchanged during said associated validity interval; and in response to receiving a new broadcast CRID:

determining an initial validity interval for the new broadcast CRID, the initial validity interval having a starting date and an ending date, during the initial validity interval the content item associated with said new broadcast CRID remains unchanged;

determining whether said new broadcast CRID is identical to a CRID stored in said CRID list;

determining whether or not the initial validity interval of the new broadcast CRID overlaps with the associated validity interval stored in the CRID list for the CRID identical to the new broadcast CRID; and adding the broadcast CRID to the GRID list only if no overlap is determined, and if an overlap is determined, not adding the new broadcast CRID to the GRID list and updating the associated validity interval of the identical CRID stored in the CRID list to having, as the starting date of the updated associated validity interval, an earliest date of the starting dates of the initial validity interval of the new broadcast CRID and the stored associated validity interval of the identical stored CRID, and as the ending date, a latest date of the ending dates of the initial validity interval of the new broadcast CRID and the stored associated validity interval of the identical stored GRID.

* * * * *